Feb. 9, 1932.  R. E. NEWELL  1,844,071
VALVE CONTROL
Filed Oct. 21, 1930   2 Sheets-Sheet 1

INVENTOR
Robert E. Newell
by Byrnes, Stebbins, Parmelee & Blenko
Attys

Feb. 9, 1932.  R. E. NEWELL  1,844,071

VALVE CONTROL

Filed Oct. 21, 1930  2 Sheets-Sheet 2

INVENTOR
Robert E. Newell

Patented Feb. 9, 1932

1,844,071

UNITED STATES PATENT OFFICE

ROBERT E. NEWELL, OF IRWIN, PENNSYLVANIA, ASSIGNOR TO ROBERTSHAW THERMO-
STAT COMPANY, OF YOUNGWOOD, PENNSYLVANIA, A CORPORATION OF PENNSYL-
VANIA

VALVE CONTROL

Application filed October 21, 1930. Serial No. 490,192.

This invention relates generally to automatically controlled valves, and, more particularly, to such automatically controlled valves provided with a manual-operated means which may be used in case of failure of the automatic control. The arrangement of the manual control is such that upon the resumption of the automatic control the manual control is again rendered inoperative. The rendering of the manual control inoperative is automatically accomplished by the resumption of the automatic control.

Although the control is applicable to many types of valves, it is described herein as particularly applied to the control of a small valve used for the stoppage and release of bleed gas from a gas-operated diaphragm valve.

In the accompanying drawings, which illustrate several embodiments of the invention, Figure 1 is a vertical section through the valve assembly, showing the valve closed and the manually controlled push pin in inoperative position to open the valve;

Figure 1:
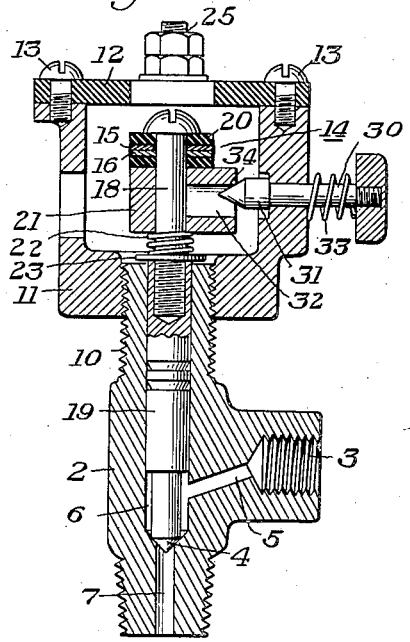
Figure 2:
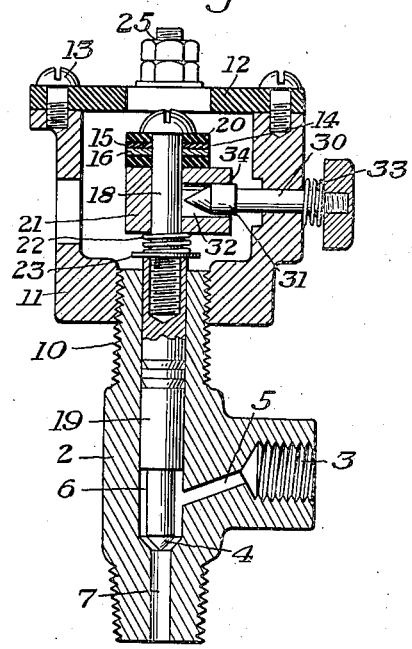
Figure 2 is a similar view, showing the manually controlled push pin in operative position after having opened the valve.
Figure 5:
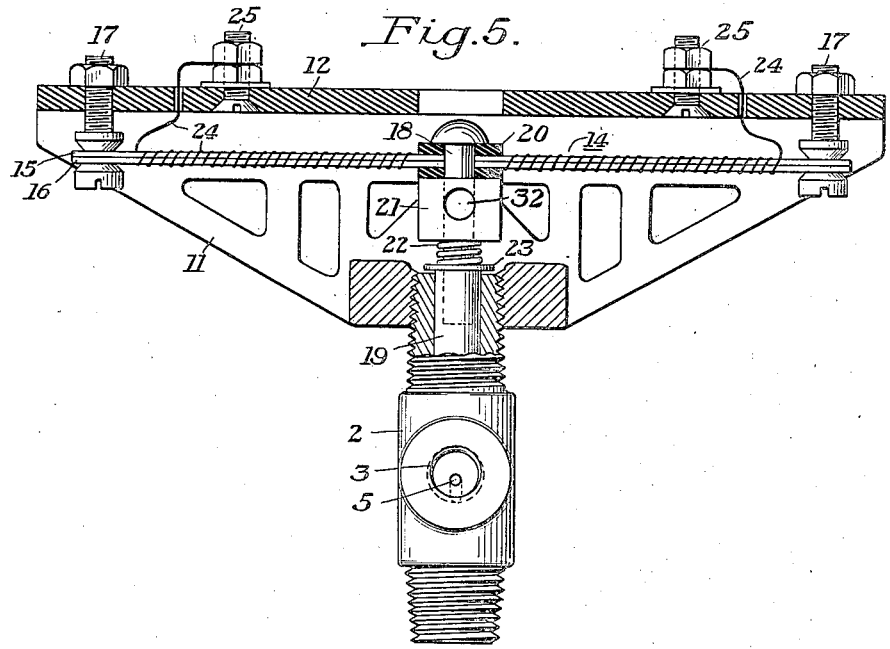
Figure 5 is a vertical section taken at right angles and through the longitudinal axis of any of the assemblies shown in Figures 1, 2, 3, and 4, parts being shown in elevation.

Referring more particularly to Figures 1 and 5, the valve control is shown as used for the stoppage and release of bleed gas from a gas-operated diaphragm valve. A valve body 2 is threaded, as indicated by the reference numeral 3, for connection with a diaphragm valve, not shown. When the valve 4 is raised, as shown in Figure 2, the bleed gas from the diaphragm valve passes through the passage 5 into the chamber 6 and leaves the valve through a passage 7. The valve body 2 is provided with threads 10 at its upper portion by means of which it is connected to a housing 11. The housing has a cover 12 made out of an insulating material such as bakelite and the cover is secured to the housing by screws 13.

Within the housing is mounted a bi-metallic element, indicated generally by the reference numeral 14, and this element is composed, as is usual, of two strips 15 and 16 of metal having unequal coefficients of expansion. The bi-metallic element is supported from the cover 12 by screws 17, shown in Figure 5. The screws 17 are grooved and the ends of the bi-metallic element are recessed so that the screws fit into the recesses and support the element. This arrangement also enables the element 14 to be quickly and easily disconnected from the screws and be reversed so as to bring the strip 16 on top and the strip 15 on the bottom. The reason for this reversal will be described more fully hereinafter.

The bi-metallic element is connected near its center by a screw 18 to the stem 19 of the valve. As shown, the screw is insulated from the bi-metallic element by insulating blocks 20. A metal block 21 is slidably mounted on the screw 18 and is normally forced upwardly against the insulating block 20 by means of a spring 22 which surrounds the screw and is interposed between the bottom of the block 21 and a washer 23.

The bi-metallic element 14 is heated by a resistance wire 24 which surrounds the element and is connected to terminals 25.

As shown in Figure 1, a push pin 30 is mounted in the housing 11 so that the head 31 of the push pin is in alinement with an opening 32 in the block 21. In this figure, the push pin is shown in inoperative position and is normally maintained in this position by a spring 33. When the push pin 30 is manually moved to the left, as indicated in Figure 2, the pointed end of the push pin contacts with a portion 34 of the block 21 to raise the block and with it the valve 4 to open the passage 7.

In the normal operation of the valve, the valve 4 is actuated automatically by means of the bi-metallic element 14 and its connections with the valve stem. In case, however, the supply of current to the resistance element 24 fails, the automatic operation of the valve is interrupted. When the current fails, the bi-metallic element cools and when the arrangement of the strips 15 and 16 is such as is illustrated in Figure 1, the cooling down of the element 14 closes the valve 4. In order to open the valve 4, it is only necessary to manually move the push pin 30 from right to left, as viewed in Figure 1, so that the push pin assumes the position indicated in Figure 2. There is a tendency for the push pin to be moved into inoperative position by the spring 33, but this tendency is overcome by the downward pressure of the bi-metallic element 14 on the head 31 of the push pin. This pressure is sufficiently great so that the block 21 and pin 30 remain in frictional engagement, thereby maintaining the valve 4 in the open position indicated in Figure 2. However, when current again flows through the resistance element 24, it heats the bi-metallic element 14 causing it to move upwardly. The upward movement of the bi-metallic element releases the frictional engagement between the block 21 and the head of the push pin and, under the influence of spring 33, the push pin snaps back into its inoperative position illustrated in Figure 1.

The arrangement above described is such that in the event of current failure, the push pin 30 can be manually operated in order to open the valve. However, upon resumption of the current, which results in the release of frictional engagement between the block 21 and the push pin 30, the push pin automatically is returned to inoperative position so that the valve 4 will thereafter be operated automatically by the bi-metallic element 14.

Figure 3:
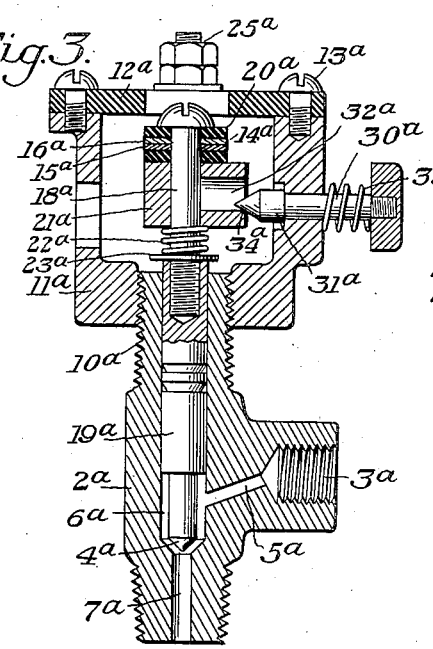
Figures 3 and 4 are views similar to Figures 1 and 2, respectively, except that the bi-metallic element which automatically controls the valve is in a reversed position.
Figure 4:
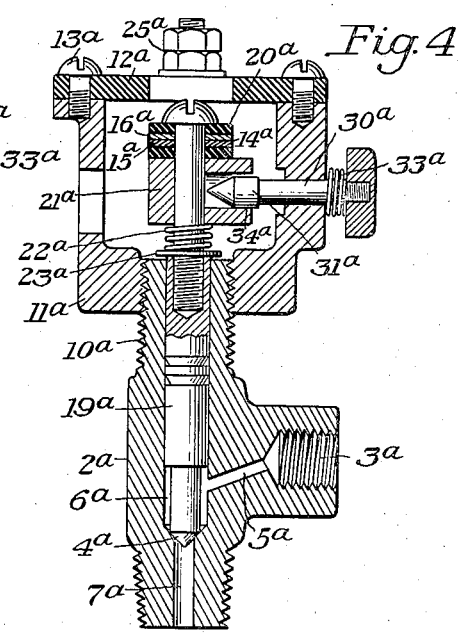

In Figures 3 and 4, corresponding parts have been marked with corresponding reference numerals with the letter "a" suffixed thereto. In this embodiment, the position of the bi-metallic element 14a has been reversed so that the strip 15a is on the bottom and the strip 16a is on the top. With this arrangement when current is supplied to the resistance element 24, thereby heating the bi-metallic element, the element bends downwardly and closes the valve. In case of current failure, however, the element is cooled and the valve 4a is opened. If it is desired to close the valve, the push pin 30a is moved as previously described, thereby forcing the block 21a downwardly, compressing the spring 22a, and closing the valve. The push pin is held in frictional engagement with the block 21a so as to hold the valve 4a closed until such time as there is a resumption of current. Upon resumption of current, the bi-metallic element 14a moves downwardly, thereby allowing the push pin 30a to spring back into its inoperative position.

Figure 6:
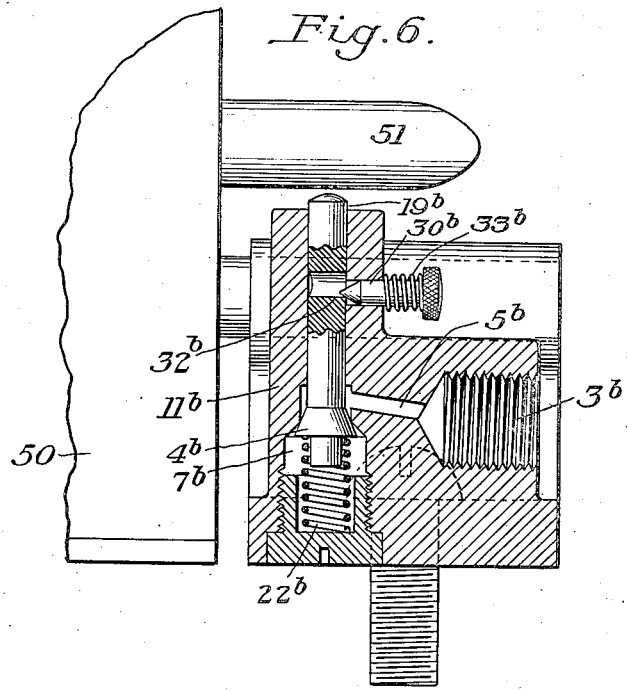
Figure 6 is a partial sectional view of a modification in which the automatic control of the valve is accomplished by a rotating cam instead of by a bi-metallic element, as illustrated in the other figures.

In Figure 6, there is illustrated a modification in which the automatic means for controlling the valve 4b is a clock mechanism 50 which operates to rotate a cam 51. During the normal automatic operation of the valve, the cam 51 is rotated by means of the clock mechanism so as to open and close the valve 4b by contact of the cam with the top of the valve stem 19b. However, in case the clock mechanism should fail, the valve 4b would remain closed, thereby cutting off communication between the passages 5b and 7b. In order to open the valve, the push pin 30b is moved to the left, as viewed in Figure 6, so that its pointed end contacts with a portion 32b of the valve stem, thereby forcing the valve downwardly. The valve is held in open position because of the friction between the push pin 30b and the valve stem 19b until such time as the clock mechanism again becomes operative. The clock mechanism then rotates cam 51 to move the valve stem downwardly, at which time the friction between these parts is released thereby enabling the spring 33b to snap the push pin into inoperative position.

I have illustrated several embodiments of my invention, but it is to be understood, however, that the invention may be otherwise embodied within the scope of the following claims.

I claim:

1. A valve control assembly, comprising a valve, automatic means for actuating the valve, a push pin for manually actuating the valve in case of failure of said automatic means, and means operable upon the resumption of operation of said automatic means for rendering said push pin inoperable.

2. A valve control assembly having automatic means for actuating the valve, and a manually operated push pin having frictional engagement with a portion of the valve to hold it in one position.

3. A valve control assembly, comprising a valve, automatic means for actuating the valve, a manually operated push pin which when in operative position frictionally engages a portion of the valve to hold it in one position, and a spring for returning the push pin to inoperative position upon the release of said frictional engagement.

4. A valve control assembly, comprising a valve, automatic means for actuating the valve, a portion of the valve having an opening, a spring pressed push pin disposed so that it can enter the opening, and means for causing frictional engagement between the valve and push pin when in operative position to hold the valve in one position.

5. A valve control assembly, comprising a valve, a bi-metallic element for actuating the valve, and a spring-pressed push pin adapted to enter an opening in a portion of the valve so as to frictionally engage it and hold the valve in one position.

6. A valve control assembly, comprising a valve, a bi-metallic element provided with an electric-resistance element and operatively connected to the valve for actuating it, the bi-metallic element being arranged so that when it is cold it closes the valve, a spring-pressed manually operated push pin which when in operative position engages a portion of the valve to open it and is frictionally engaged against said portion under the influence of said bi-metallic element.

7. A valve control assembly, comprising a valve, a bi-metallic element provided with an electric-resistance element and operatively connected to the valve for actuating it, a block slidable on the stem of the valve, a spring normally forcing the block upwardly, the block being provided with an opening, and a spring-pressed manually operated push pin adapted to enter the opening in the block and frictionally hold the valve in the position towards which the bimetallic element when operative normally impels the valve.

In testimony whereof I have hereunto set my hand.

ROBERT E. NEWELL.